Patented Aug. 16, 1949

2,479,202

UNITED STATES PATENT OFFICE 2,479,202

RECOVERY OF SULFONIC COMPOUNDS FROM SULFURIC ACID SLUDGE

David W. Bransky, Chicago, Ill., and Norman E. Lemmon, Hammond, Ind., assignors to Standard Oil Company, Chicago, Ill., a corporation of Indiana No Drawing. Application September 24, 1946, Serial No. 699,080

7 Claims. (Cl. 260—504)

This invention relates to improvements in the recovery of petroleum sulfonic acids from acid sludge, and more particularly to the recovery of preferentially water-soluble detergent-type sulfonic acids from unhydrolyzed sulfuric acid sludges resulting from the treatment of hydrocarbon oils with concentrated sulfuric acid.

In the refining of hydrocarbon oils, such as petroleum oils with sulfuric acid, such as concentrated or fuming sulfuric acid, mixtures of sulfonic acids are produced. These sulfonic acids vary over a wide range in the degree of water-solubility and of oil-solubility. Certain of these sulfonic acids which are reddish-brown in color and generally referred to as mahogany acids, are preferentially oil-soluble. Another class of sulfonic acids which are found in the acid sludge layer are generally referred to as green acids because of their greenish color. These so-called green acids are preferentially water-soluble. The so-called green acids are in fact mixtures of very water-soluble sulfonic acids known as black acids, intermediate water-soluble sulfonic acids, which are herein referred to as water-soluble, detergent-type sulfonic acids and preferentially oil-soluble sulfonic acids generally referred to as brown acids. The so-called black acids are more water-soluble than the intermediate water-soluble, detergent-type sulfonic acids, while the so-called brown acids or the preferentially oil-soluble are less oil-soluble than are the mahogany acids.

In the usual process of refining petroleum oils, the oil is treated with a strong sulfuric acid, generally fuming sulfuric acid, and the acid sludge which is formed is separated from the acid-treated oil. From the acid-treated oil there are recovered the preferentially oil-soluble sulfonic acids or the so-called mahogany acids. In the acid sludge there are found the black acids, the intermediate water-soluble, detergent-type sulfonic acids and the oil-soluble brown acids. Heretofore, the preferentially water-soluble sulfonic acids were recovered from the acid sludge as so-called green acids by adding water to the sludge to dilute the sulfuric acid to a concentration of 20-30% at which concentration the green acids separate to form a supernatant layer, or by extraction with water-soluble solvents or with mixtures of organic solvents and water. The extract so recovered from the acid sludge contained substantial amounts of black acids and brown acids which materially decreased the detergency value of the intermediate water-soluble, detergent-type sulfonic acids.

It is an object of the present invention to provide a method of recovering intermediate water-soluble, detergent-type sulfonic acids from unhydrolyzed sulfuric acid sludges resulting from the treatment of hydrocarbon oils with concentrated or fuming sulfuric acid. Another object of the invention is to provide a method of selectively extracting intermediate water-soluble, detergent-type sulfonic acids from sulfuric acid sludges resulting from the treatment of petroleum oils with concentrated or fuming sulfuric acid. Other objects and advantages of the invention will become apparent from the following description thereof.

We have discovered that the intermediate preferentially water-soluble, detergent-type sulfonic acids found in sulfuric acid sludge resulting from the treatment of hydrocarbon oils with strong sulfuric acid can be selectively recovered from such sludges by extraction, first with a paraffinic solvent and then with an aromatic hydrocarbon solvent. Examples of suitable aromatic solvents are benzene, commercial benzol, toluene, xylene, naphthalene, and alkylated benzenes and naphthalenes. A suitable aromatic solvent is a coal tar fraction having a boiling range of about 266° F. to about 338° F. and comprised primarily of toluene, xylene and mesitylene; this coal tar fraction is commonly referred to as "solvent naphtha." Another suitable aromatic solvent is the aromatic fraction obtained from the fractionation of hydroformed naphtha, boiling between about 380° F. and 730° F., comprising primarily methylated benzenes and naphthalenes, and known in the art as "hydroformer bottoms." The aromatic hydrocarbon solvent is preferably one that does not react readily at room temperature with sulfuric acid in the sludge. Suitable paraffinic solvents are light petroleum oils and naphthas, particularly virgin naphthas having a maximum A. S. T. M. distillation temperature of not more than about 500° F., and preferably having a distillation range of about 150° F. to about 350° F. and containing not more than about 5% aromatic hydrocarbons. In extracting the sludge with the aromatic hydrocarbon solvents the ratio of the latter to the volume of unhydrolyzed sludge to be extracted can vary from about 0.5:1 to 5:1, although we prefer to use ratios from about 1:1 to about 3.5:1. These same ratios can be suitably used for extracting the sludge with the paraffinic solvent. The temperature employed in extracting the acid sludge can vary from about 50° F. to about 150° F., and preferably from about 75° F. to about 100° F. For the most effective extraction, it is desirable to provide means for intimately contacting the unhydrolyzed acid sludge with the solvent. Suitable contact can be obtained by means of high speed, propeller type stirrers or by orifice mixers.

In accordance with the present invention the unhydrolyzed sulfuric acid sludge resulting from the treatment of hydrocarbon oil, for example a petroleum oil having a Saybolt Universal viscosity at 100° F. of about 45 seconds, with fuming or concentrated sulfuric acid is thoroughly mixed in the proper predetermined ratio with a paraffinic solvent, such as a virgin naphtha of the herein-described type. After suitable contacting, the mixture is allowed to settle and separate into a sludge fraction and a solvent fraction containing the oil-soluble brown acids, and the latter is recovered. The extracted acid sludge is then again extracted with the aromatic hydrocarbon solvent and, after suitable contacting, the mixture of sludge and solvent is settled to permit stratification of the sludge and solvent layers and the solvent layer containing the intermediate water-soluble, detergent-type sulfonic acids subsequently separated from the sludge layer.

The aromatic hydrocarbon solvent layer containing the intermediate water-soluble, detergent-type sulfonic acids will normally contain small amounts of a dilute electrolyte, such as sulfuric acid, or water. Under these conditions, the intermediate water-soluble, detergent-type sulfonic acids can be precipitated from the aromatic solvents by mixing the aromatic solvent layer with a paraffinic solvent, such as naphtha. Alternatively, the aromatic solvent layer can be neutralized with caustic soda solution and the intermediate water-soluble, detergent-type sulfonic acid soaps precipitated by the addition of the paraffinic solvent. Under certain conditions it may be necessary to add a small amount of a dilute electrolyte such as sulfuric acid, water, sodium hydroxide, or sodium sulfate to the aromatic solvent layers in order to precipitate the sulfonic acid or the soap from the aromatic solvent or the mixture of aromatic and paraffinic solvents.

If the aromatic hydrocarbon solvent extract contains some undesirable black sulfonic acids these may be removed by reducing the concentration of any electrolyte present in the extract layer to a concentration which will not permit the precipitation of the intermediate water-soluble, detergent-type sulfonic acids, and adding two to four volumes of a paraffinic solvent to the aromatic hydrocarbon solvent extract. Under these conditions the black sulfonic acids will be precipitated but not the intermediate water-soluble, detergent-type sulfonic acids. After removal of the black sulfonic acids the concentration of electrolytes in the aromatic sulfonic extract can be increased by adding thereto small amounts of sulfuric acid, or if the extract is neutralized, sodium hydroxide or sodium sulfate, and the water-soluble, detergent-type sulfonic acids or sulfonates precipitated from the aromatic solvent by the addition of a paraffinic solvent.

The selective extraction of oil-soluble brown sulfonic acids and intermediate water-soluble detergent-type sulfonic acid sluges is illustrated by the following experiment: A Coastal oil transformer distillate having a Saybolt Universal viscosity at 100° F. of 60 seconds was treated with four pounds of fuming sulfuric acid in ½ pound treats (or dumps) and the sludge resulting therefrom separated from the acid-treated oil. Employing a volume ratio of solvent to sludge of 2.5:1, the acid sludge was extracted with a virgin naphtha having an A. S. T. M. distillation range of from about 100° F. to about 370° F. and the extract removed. This extract contained 4.7% oil-soluble brown acids. The naptha-extracted sludge was then twice extracted with 2.5 volumes of benzene to each volume of sludge and about 18% of water-soluble, detergent-type sulfonic acids was recovered. The benzene extract was then neutralized with caustic soda, and upon dilution with about two volumes of a paraffinic naphtha, the sodium sulfonates were completely precipitated. A small amount of solvent in the precipitated sulfonates was then removed by distillation.

In extracting the water-soluble, detergent-type sulfonic acids with the aromatic hydrocarbon solvent in accordance with the present invention, it is essential that the extraction be carried out in the absence of any substantial amount, that is, not more than about 1%, of added water in order to avoid the extraction of any undesirable black sulfonic acids with the water-soluble, detergent-type sulfonic acids.

The term "intermediate water-soluble, detergent-type sulfonic acids" as used herein and in the appended claims includes those sulfonic acids recovered from unhydrolyzed sulfuric acid sludges which are water-soluble to the exclusion of any substantial quantities of preferentially water-soluble black sulfonic acids and/or preferentially oil-soluble brown sulfonic acids. The term "intermediate water-soluble, detergent-type sulfonates" means salts of such sulfonic acids.

The term "strong sulfuric acid" as used herein and in the appended claims includes concentrated sulfuric acid of at least about 95% strength and fuming sulfuric acid.

While we have described our invention by way of preferred embodiment thereto, other modifications may be made without departing from the scope and spirit of this invention. We, therefore, include within the scope of our invention such modifications as come within the spirit of the appended claims.

We claim:

1. The method of selectively extracting intermediate water-soluble, detergent-type sulfonic acids from unhydrolyzed sulfuric acid sludge resulting from the treatment of a hydrocarbon oil with strong sulfuric acid comprising extracting said unhydrolyzed sulfuric acid sludge with a paraffinic solvent, removing the paraffinic solvent extract from said sludge, and extracting the sludge with an aromatic hydrocarbon solvent in the absence of added water.

2. The method of selectively extracting intermediate water-soluble, detergent-type sulfonic acids from unhydrolyzed sulfuric acid sludge containing preferentially oil-soluble brown sulfonic acids, intermediate water-soluble, detergent-type sulfonic acids and preferentially water-soluble black sulfonic acids, resulting from the treatment of a hydrocarbon oil with strong sulfuric acid, comprising the steps, extracting said unhydrolyzed sulfuric acid sludge with a paraffinic hydrocarbon solvent, separating the paraffinic hydrocarbon solvent extract from the sludge, extracting the paraffinc hydrocarbon solvent-extracted acid sludge with an aromatic hydrocarbon solvent in the absence of added water, separating the aromatic solvent extract from the extracted acid sludge, and adding a paraffinic solvent to the said aromatic solvent extract in the presence of sufficient electrolyte, whereby intermediate water-soluble, detergent-type sulfonic acids are precipitated from the solvent mixture.

3. The method of claim 2 wherein the aromatic hydrocarbon solvent is benzene.

4. The method of claim 2 wherein the aromatic hydrocarbon solvent is coal tar solvent naphtha.

5. The method of claim 2 wherein the aromatic hydrocarbon solvent is hydroformer bottoms.

6. The method of claim 2 wherein the paraffinic solvent is a petroleum naphtha containing less than 5% aromatics.

7. The method of selectively separating intermediate water-soluble, detergent-type sulfonic compounds from unhydrolyzed sulfuric acid resulting from the treatment of a hydrocarbon oil with strong sulfuric acid, comprising extracting said sludge with a paraffinic hydrocarbon solvent, separating the paraffinic hydrocarbon solvent extract from said sludge, contacting the extracted acid sludge in the absence of added water with an aromatic hydrocarbon solvent, separating an aromatic hydrocarbon solvent extract from the acid sludge, neutralizing the aromatic hydrocarbon solvent extract with an alkaline reagent, and precipitating water-soluble, detergent-type sulfonates from the neutralized aromatic hydrocarbon solvent extract by adding thereto a paraffinic hydrocarbon solvent in the presence of a sufficient amount of an electrolyte.

DAVID W. BRANSKY.
NORMAN E. LEMMON.

REFERENCES CITED

The following references are of record in the file of this patent:

UNITED STATES PATENTS

| Number | Name | Date |
|---|---|---|
| 2,263,041 | Lazar et al. | Nov. 18, 1941 |
| 2,368,452 | Dawson | Jan. 30, 1945 |